United States Patent [19]

Zuzanov et al.

[11] 4,285,704

[45] Aug. 25, 1981

[54] APPARATUS FOR PURIFYING AIR

[76] Inventors: Georgy I. Zuzanov, ulitsa Vavilova, 93, kv. 39; Iosif S. Mironkin, Balaklavsky prospekt, 4, korpus 5, kv. 301; Jury N. Tsarik, 9 mikroraion Teplogo Stana, 2b, kv. 317; Natalia A. Alexandrova, 9 mikroraion Teplogo Stana, 2b, kv. 218; Sergei N. Kamensky, ulitsa Koshtoyantsa 5, kv. 17; Evgeny N. Nevedomsky, Nagorny bulvar, 3, kv. 54, all of Moscow, U.S.S.R.

[21] Appl. No.: 65,548

[22] Filed: Aug. 10, 1979

[30] Foreign Application Priority Data

Aug. 16, 1978 [SU] U.S.S.R. .................. 2654709

[51] Int. Cl.³ .............................................. B01D 50/00
[52] U.S. Cl. ........................................ 55/274; 55/276; 55/288; 55/291; 55/303; 55/317; 55/334; 55/337; 55/401; 55/429; 55/472; 55/DIG. 3
[58] Field of Search ................ 55/274, 276, 288, 291, 55/302, 303, 211, 317, 323, 324, 328, 336, 337, 401, 402, 429, 472, DIG. 3, DIG. 34, 334; 15/349, 352, 339

[56] References Cited

U.S. PATENT DOCUMENTS

| 2,198,568 | 4/1940 | Yonkers, Jr. | 55/276 |
| 2,496,180 | 1/1950 | Smith et al. | 15/339 |
| 3,008,543 | 11/1961 | Bourdale' et al. | 55/317 |
| 3,177,635 | 4/1965 | Cawl et al. | 15/339 |
| 3,224,172 | 12/1965 | Eiben | 55/303 |
| 4,060,050 | 11/1977 | Simonsson | 55/274 |

FOREIGN PATENT DOCUMENTS

| 1909493 | 9/1970 | Fed. Rep. of Germany | 55/337 |
| 247958 | 4/1947 | Switzerland | 55/324 |
| 442108 | 2/1936 | United Kingdom | 55/323 |
| 912699 | 12/1962 | United Kingdom | 55/337 |

Primary Examiner—David L. Lacey
Attorney, Agent, or Firm—Lackenbach, Lilling & Siegel

[57] ABSTRACT

An apparatus for separating solid impurities from a fluid, such as air, comprising a housing, a set of filter elements fixed on a set of perforated sleeves, a fan with a driving electric motor, a louvered cyclone positioned around the filter elements, a centrifugal coupling designed to automatically connect the set of perforated sleeves with the shaft of the electric motor, and a receptacle for impurities separated from the air by the apparatus.

7 Claims, 2 Drawing Figures

APPARATUS FOR PURIFYING AIR

FIELD OF THE INVENTION

The present invention relates to a centrifugal-type purifying apparatus and, more particularly, it relates to an apparatus for separating solid impurities from a fluid, such as air.

The present invention can be used in mechanical engineering and other industries for drawing off dust- and fine shavings-laden air from the working zone of machines (for example, abrasive machines) and in particular for separating solid impurities from the air.

BACKGROUND OF THE INVENTION

Known in the art is an air purifying apparatus (cf., an advertising publication D.6 by the English firm of Spencer and Halstead Ltd., p.2) wherein contaminated air is drawn off by a fan and directed to the inner spaces of hose filters to be purified from impurities by passing through the walls of said filters. The cleaning of the filters of the impurities deposited on their inner surfaces is done manually, to which end the filters are to be unfastened and removed from the apparatus.

There is also known an air purifying apparatus (cf., an advertising publication by the Dutch branch of Torit (U.S.A.), Publication GBF-72F, p.3 a figure on the right) wherein the filtering material is stretched over rectangular frames. The filters are cleaned manually after being unfastened and removed from the apparatus.

Another prior art apparatus for purifying air (cf., a model "Kleinstfilter" (Normalausführung) by Ventilatorenfabrik Oelde GmbH, BRD) has filters attached to the inner side of an opening cover. The filters are cleaned manually by means of a brush with the cover opened.

One more prior art air purifying apparatus (cf., the advertising publication D.6 by the English firm of Spencer and Halstead Ltd, p. 3) has the filtering material stretched over triangular frames suspended from a rack with a handle extending outwards. The filters are cleaned manually by shaking them by means of the handle.

In still another prior art apparatus (cf., a model monobloc-Entstauber m 120 and m 150 by Wieland KG lufttechnik BRD) the ends of filters are shaped as round hoses and are fixed in two plates of which the top plate is movable. The cleaning of the filters is done by shaking the hoses by way of manually effected reciprocation of the top plate in the vertical direction by means of an outwardly extending handle.

Prior art apparatus for drawing off dust and fine shavings lack suppressors of noise caused by the air leaving the apparatus. This air featurin g substantial volume and high velocity causes considerable noise on being discharged directly to the atmosphere from the apparatus.

Closest of all to the disclosed apparatus is an apparatus for purifying air (cf., Yu. V. Abrosimov, Frame-Type Glass Cloth Filters Developed in NIIOGAZ, published in Russian by Mashinostroiyeniye Publishers, Moscow, 1972, pp. 64–65) in which a set of filter elements comprising frames covered with filtering material stretched thereon are mounted on a horizontally extending hollow perforated shaft resting at the edges against bearings secured on the body of a filtering chamber. One end of the hollow shaft is closed while the other end is connected to an air draft stimulator (fan). During the operation of the apparatus, the hollow shaft with the filter elements rotates continuously by the action of an independent electric motor.

The air supplied to the filtering chamber of the apparatus passes through the filtering material from the outside to the inner space of the filter elements and then via openings in the wall of the hollow shaft and further along the inner space of the shaft to the fan. Impurities contained in the gas supplied to the apparatus tend to deposit on the surface of the filter elements, however, due to the centrifugal force developd upon rapid rotation of said filter elements, the gas adjacent to the filter elements is repelled from the latter such that the impurities (with the exception of finer ones) are prevented from depositing on the surface of the filter elements. As a result of this, the filtering cloth is slightly clogged therefore only loses its filtering power to a very minor extent.

In order to preclude the deposition of impurities on the surface of the filter elements, the latter should be rotated at a high speed. In so doing, however, the layer of air adjacent to the filter elements is repelled from the latter with a considerable force which sets up a great obstacle to the passage through the filtering cloth of air under the effect of a section or rarefaction produced by the fan, which results in an extremely low efficiency of the apparatus.

The finest impurity particles deposited on the surface of the filtering material hold on in spite of the rotation of the filter elements, due to the "suction" adherence to their surface under the effect of high evacuation produced by the fan in the inner space of the filter elements.

BRIEF DESCRIPTION OF THE INVENTION

It is an object of the present invention to provide an apparatus for separating solid impurities from air, wherein the cleaning of filter elements would be done automatically with high efficiency and without the use of an additional driving electric motor, by utilizing the available electric motor rotating the rotor of the fan.

It is another object of the present invention to provide an apparatus for separating solid impurities from air, wherein the noise of air discharged from the apparatus could be reduced.

This invention resides in the fact that in an apparatus for separating solid impurities from air, comprising a housing with an air suction port, a set of filter elements located in the housing, and a fan with a driving electric motor, is connected to the housing. A louvered cyclone designed for the preliminary separation of solid impurities is positioned around the filter elements which are secured on a set of perforated sleeves drawn together by means of bars. A centrifugal is adapted to intermittently effect an automatic connection of the filter element carrying the perforated sleeves with the driving electric motor, and a receptacle for storing impurities from the air purified by the apparatus is located in the bottom portion of the housing.

It is expedient that the apparatus of the present invention includes a pipe which communicates the pressure space of the fan with the inner space of the filter elements, and a system of valves insuring the supply of air from the pressure space of the fan to the inner space of the filter elements and said valves being located at the ends of the set of perforated sleeves.

It is desirable that the apparatus of the present invention include means for reducing the level of noise caused by purified air leaving the apparatus.

It is preferred that the means for reducing the level of noise be fashioned as two concentrically arranged cylindrical casings with perforated disks of sound-absorbing material installed therebetween at some distance from each other.

It is possible that a tapered attachment be secured on the cylindrical casings, the inner surface of said tapered attachment being coated with a layer of perforated sound-absorbing material.

It is expedient that the receptacle for storing impurities from the air being purified is formed as a box mounted on support plates secured on an axle and mechanically coupled with a switch connected to an illuminated panel secured on the outside of the apparatus.

The use of the present invention considerably improves the sanitary conditions of labor in factories.

BRIEF DESCRIPTION OF DRAWINGS

The present invention will be apparent upon considering the following detailed description of a specific embodiment thereof, and with reference to the accompanying drawings in which.

DETAILED DESCRIPTION OF THE INVENTION

Figures 1, 2:
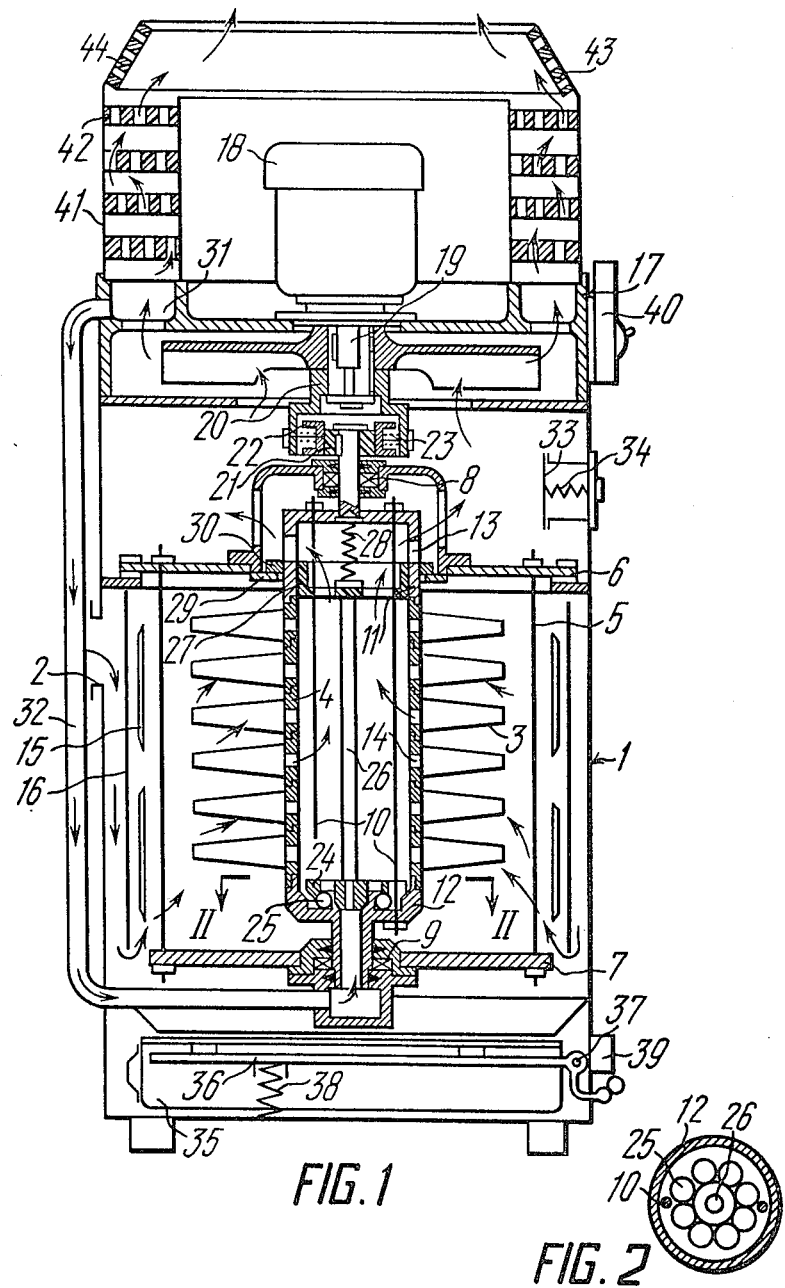
FIG. 1 is a side elevational view, partially in section, of the apparatus for purifying air, made in accordance with the present invention.
FIG. 2 is a cross-sectional view taken along the line II—II of FIG. 1.

Referring now to FIG. 1 of the accompanying drawings, the apparatus for separating solid impurities from a fluid, such as air, comprises a housing 1 with an air suction port 2, a set of filter elements 3 fixed on a set of perforated sleeves 4, located in the housing 1 and mounted between two plates 6 and 7 interconnected by pins 5. The housing 1 being divided into inlet and outlet chambers with the outlet chamber above said plate 6. The set of perforated sleeves 4 rests against bearings 8, 9 and is drawn together by bars 10. The bars 10 pass through sockets 11, 12 located at the ends of the set of perforated sleeves 4 and having shanks carrying the bearings 8, 9. Holes 13 are provided in the wall of the socket 11.

Each filter element 3 comprises a frame covered with filtering material stretched thereon. The perforated sleeves 4 have holes 14 serving to communicate the inner space of the sleeves 4 with the inner space of the filter elements 3.

The apparatus further comprises a cyclone 16 designed for the preliminary separation of solid impurities from the air; said cyclone having louvers 15 and being positioned around the filter elements 3 and generally defining the inlet chamber.

The apparatus of the invention also comprises a fan 17 connected to a driving electric motor 18 and connected to the housing 1. A shaft 19 of the electric motor 18 is coupled with the shank of the socket 11 by means of a centrifugal coupling.

A drive element 20 of the centrifugal coupling is fastened on the shaft 19 of the electric motor 18 while its driven element 21 is fixed on the shank of the socket 11.

Shoes 22 of the centrifugal coupling are urged against the driven element 21 by the force of springs 23.

The socket 12 accommodates in the hollow threreof a tapered valve 24 movable by means of balls 25 of a centrifugal ball mechanism. The tapered valve 24 is connected by means of a bar 26 with a piston valve 27 affected by a spring 28 located in the hollow of the socket 11.

The gap between the outer surface of the socket 11 and a bearing disk 29 is overlapped by the lower end of a seal ring 30 mounted on the socket 11 and rotating therewith.

A pressure zone 31 of the fan 17 is in communication with the opening of the socket 12 by means of a pipe 32.

Built into the wall of the upper space of the housing 1 is a plate valve 33 which is urged against the valve seat by a spring 34.

A box 35 serves as a receptacle for the impurities trapped by the apparatus in the course of their separation from air. The box 35 is mounted on support plates 36 turning about a stationary axle 37 and resting against a spring 38. The plates 36 cooperate with a switch 39 designed to switch on illuminating bulbs on an illuminated panel 40 attached to the apparatus.

Mounted on the fan 17 is a means 41 provided as concentrically arranged hollow cylindrical casings with perforated disks 42 of sound-absorbing material mounted between said casings at some distance from each other. The means 41 has a tapered attachment 43 secured thereon, whose inner surface is coated with a layer 44 of perforated sound-absorbing material.

The path followed by air in the course of operating the apparatus is shown by the directional arrows.

The apparatus for separating solid impurities from air operates in the following manner.

Upon rotation of the driving electric motor 18 of the fan 17, the rotor of the fan 17 rotates rotor drawing off the air from the inner space of the housing 1 and expelling it to the atmosphere. Due to the rarefaction or suction developed in the housing 1, contaminated air from the working zone of the machine (not shown in the drawings) serviced by the apparatus of the invention is supplied via the port 2 inside the housing 1 wherein it first moves over the cyclone 16.

Upon such movement of air, large particles of impurities fall out due to centrifugal forces and thus deposit in the box 35.

Further, the air passes from the outside through the filtering material to the inner space of the filter elements 3, with the impurities being trapped on the surface of the filter elements 3.

The air passes through the filtering material of the filter elements 3 and passes via the holes 14 of the sleeves 4 and the holes 13 in the wall of the socket 11 to the fan 17 which expels said air to the atmosphere through holes punched in the disks 42 and then alongside the layer 44 of perforated sound-absorbing material of the tapered attachment 43.

After the electric motor 18 reaches its full r.p.m. value, the shoes 22 of the centrifugal coupling acted upon by the emerging centrifugal force overcome the force of the springs 23 and move away from the driven element 21 of the coupling, as a result of the set of the filter elements 3 remain stationary during the periods in which the apparatus of the invention is drawing off contaminated air.

When the electric motor 18 does not rotate, the shoes 22 of the centrifugal coupling are urged by the springs 23 against the driven element 21 of the coupling.

After switching on the electric motor 18 (which, under factory conditions, usually occurs in the morning at the beginning of a working day and after lunch break in the afternoon), it is accelerated to a full r.p.m. value over some short period of time during which the centrifugal coupling is instrumental in imparting fast rotation to the set of filter elements 3 from the electric motor 18, with the centrifugal force emerging during this period of fast rotation removing the layer of impurities which have previously deposited on the surface of the filter elements 3. The impurities removed from the filter elements 3 are trapped by the extending parts of the louvers 15 directed opposite the rotation of the filter elements 3, and pass via holes in the louvers 15 into the channel of the cyclone 16 so as to be deposited in the box 35.

The springs 23 of the centrifugal coupling are selected to be such that, after the electric motor 18 reaches an r.p.m. value close to the maximum (normal) one, the centrifugal force of the shoes 22 would be capable of overcoming the force of the springs 23. In so doing, the shoes 22 withdraw from the driven element 21 of the coupling, after which the rotation of the set of filter elements 3 ceases.

During the period of rotation of the set of filter elements 3, the balls 25 (FIG. 2) are caused by centrifugal force to move from the center to the periphery of the inner space of the socket 12 and act upon the tapered surface of the valve 24 in contact therewith to raise said valve from its seat and to open the passage of air from the pressure space 31 (FIG. 1) of the fan 17 via pipe 32 and the holes 14 in the sleeves 4 to the inner space of the filter elements 3.

The lifting of the tapered valve 24 by means of the bar 26 is accompanied with the lifting of the piston valve 27 during which the latter valve compresses the spring 28 and closes the holes 13 in the wall of the socket 11. This precludes the possibility of passage into the suction zone of the fan 17 of the air supplied from its pressure zone 31 via pipe 32 and the valve 24 to the inner spaces of the filter elements 3.

During the period of rotation of the set of filter elements 3, the air at a higher-than-atmospheric pressure, supplied from the zone 31 of the fan 17 to the inner space of the filter elements 3 passes from the internal side thereof to the outside through the filtering material, and increases the degree of efficiency of the automatic cleaning of the filter elements 3, thereby maintaining their high capacity and suction or rarefaction of air in the port 2 in the course of the apparatus's operation.

After the electric motor 18 reaches the maximum (normal) r.p.m. value and the rotation of the set of filter elements 3 ceases, the balls 25 (FIG. 2) move towards the center of the socket 12 and the tapered valve 24 (FIG. 1) is lowered onto the seat by the action of the spring 28 to close the passage of air from the pipe 32 to the inner space of the filter elements 3 and to open the passage of air to the suction zone of the fan 17.

During the periods of rotation of the set of filter elements 3, the supply of air to the suction zone of the fan 17 is discontinued due to the fact that the piston valve 27 overlaps and covers the holes 13 in the wall of the socket 11. This causes an elevated vacuum in the upper space of the housing 1 and an increase in the difference of air pressures upon the ends of the plate valve 33, whereby the latter overcomes the force of the spring 34 and opens to pass atmospheric air to suction zone of the fan 17. After the rotation of the set of filter elements 3 discontinues, the supply of air is resumed to the suction zone of the fan 17 via holes 13 in the wall of the socket 11. This eliminates the reason which caused the opening of the plate valve 33 and the latter will close.

The high level of noise caused by the discharge from the fan 17 of a considerable volume of air at a high velocity is reduced to the required level owing to displacement of air to the atmosphere via through holes provided in the disks 42 and then along the layer 44 of the attachment 43. The cross-sectional area of each one of the holes punched in the disks 42 exceeds that of a pore in the porous sound-absorbing material of the disk 42. Said disks 42 also serve to entrap minute particles of impurities which passed through the filter elements 3.

The air purified by the apparatus of the invention is discharged into the factory atmosphere.

As the box 35 is filled by impurities entrapped by the apparatus, the springs 38 will compress under the increasing weight of impurities in the box 35 while the plates 36 will gradually turn about the axle 37.

When the box 35 is filled with impurities up to the limit, the final turn of the support plates 36 cooperating with the switch 39 causes the bulbs of the panel 40 bearing the legend "Clear the box" to light up indicating to the operator the need to open the cover of the housing 1 (cover not shown in the drawings), remove the box 35, clean it of impurities and install it back into the apparatus. The provision in the disclosed apparatus of efficient automatic cleaning of the filter elements 3 helps maintain throughout the entire service life of the apparatus a capacity close to the initial capacity of the apparatus when it is equipped with new filter elements.

This makes for a continuous efficient drawing off of contaminated air from the working zone of the various machines and for the removal from the air of impurities dangerous to human health.

In addition, the provision in the disclosed apparatus of the means serving to considerably reduce the noise caused by discharged purified air presents an important advantageous feature of the apparatus of the invention.

At the same time, said latter means helps increase the degree of purification of contaminated air by the apparatus of the invention, which makes for a higher level of air purity on the premises of a factory where the apparatuses are installed.

Although the present invention has been described in some detail by way of illustration and example for purposes of clarity of understanding, it will, of course, be understood that various changes and modifications may be made in the form, details, and arrangements of the parts without departing from the scope of the invention as set forth in the following claims.

What is claimed is:

1. An apparatus for separating solid impurities from a fluid, such as air, comprising: a housng, having inlet and outlet chambers, and having mounted thereon in said outlet chamber a spring-loaded plate valve constructed and arranged to admit atmospheric air to said outlet chamber of said housing as desired; a suction port provided in said inlet chamber of said housing for drawing in air; a plurality of perforated sleeves and a socket element including shaft means mounted at each end of said sleeves to form a rotatably mounted cylindrical hollow sleeve, the upper socket having gas outlet means, and said cylindrical hollow sleeve being rotatably mounted and located in said inlet chamber of said housing; a plurality of filtered elements secured on said perforated sleeves and being mounted between upper and lower plates, having central openings and dividing said housing into said inlet and outlet chambers with the outlet chamber above said upper plate and said inlet chamber residing between said upper and lower plates; fan means including a pressure space and air outlet means disposed above said outlet chamber for drawing off air from within said perforated sleeves which are rotatably mounted between the central openings of said plates; an electric motor having a shaft for rotating said fan means; a cyclone having louvers for preliminary separation of the solid impurities and being positioned around said filter elements and between said filter elements and said housing in said inlet chamber; a centrifugal coupling including a driver element secured to the shaft of said electric motor and a driven element connected to one of said socket elements and said centrifugal coupling constructed and arranged to intermittently effect an automatic rotatable connection of said plurality of perforated sleeves with said electric motor so that after said electric motor reaches its full rpm value, the driven element of said coupling is disconnected from the driver element of said centrifugal coupling, so that said plurality of filter elements remain stationary while said apparatus is drawing off contaminated air; and a receptacle at the bottom portion of said housing for storing impurities separated from the air by said apparatus, whereby the solid impurities in said air, upon first entering said suction port, and subsequently passing through said cyclone, said filtered elements and said perforated sleeves, are separated therefrom, and the cleaner air, exiting from said end of said perforated sleeve connected to said driven element, enters said outlet chamber and then said pressure space before exiting to the atmosphere.

2. An apparatus as set forth in claim 1, further including a fluid passageway providing a connection between said pressure space of said fan means and the interior of said hollow chamber; and a pair of valves positioned and arranged to maintain the control of the supply of air from said fluid passageway, and said pair of valves being located at opposite ends of said hollow chamber.

3. An apparatus as set forth in claims 1 or 2, comprising means mounted on said fan means for reducing the level of noise of the purified air being discharged from the apparatus.

4. An apparatus as set forth in claim 3, wherein said means for reducing the level of noise comprising stacked concentrically arranged hollow cylindrical casings with perforated disks of sound-absorbing material installed therebetween; and a tapered attachment is secured on the top casing of said stacked cylindrical casings, and the inner surface of said attachment is coated with a layer of perforated sound-absorbing material.

5. An apparatus as set forth in claim 2, wherein one of said pair of valves is a tapered valve plugging said fluid passageway, and said tapered valve being axially movable to unplug said fluid passageway by means of a plurality of balls of a centrifuge ball mechanism.

6. An apparatus as set forth in claim 5, wherein the other valve of said pair of valves is a spring-loaded apertured socket member constructed and arranged with respect to a movable piston valve connected to said tapered valve by means of a rigid rod disposed within said perforated sleeves, and the opening and closing of the apertures of said socket members is achieved by the piston valve moving across the apertures so as to block same.

7. An apparatus as set forth in claim 1, including an illuminated panel mounted on said housing; support plates mounted on an axle; and a switch; the receptacle for storing impurities from the air being purified, being in the form of a box mounted on said support plates and mechanically coupled with said switch which is connected to said illuminated panel.

* * * * *